UNITED STATES PATENT OFFICE.

BERNARD LAUTH, OF HOWARD, ASSIGNOR, BY MESNE ASSIGNMENTS, TO BENJAMIN F. JONES AND JAMES LAUGHLIN, OF PITTSBURG, PA.

IMPROVEMENT IN POLISHING IRON BARS AND RODS.

Specification forming part of Letters Patent No. 31,546, dated February 26, 1861; extended seven years; reissue No. 7,004, dated March 21, 1876; application filed March 15, 1876.

*To all whom it may concern:*

Be it known that I, BERNARD LAUTH, formerly of Pittsburg, in the State of Pennsylvania, now of Howard, in the County of Centre and State of Pennsylvania, have invented a new and useful Improved Manufacture of Polished Bars and Rods of Iron or Steel, embracing the process and product; and I do hereby declare the following to be a full, clear, and exact description thereof:

My invention consists in the process or method of polishing or finishing rods, bars, sheets, or plates of iron or steel, which have been previously rolled or drawn out by the ordinary process of rolling to the required size and shape by first removing the scale from the surface of the metal, and then subjecting them to heavy rolling-pressure of smooth, cold rolls, whereby the fiber of the metal being rolled is packed down and the surface becomes bright and polished, and in the product resulting from the use of said process.

My invention is applicable to any kind or shape of iron and steel that can be drawn out between rolls. The bars, plates, or sheets to be polished are first shaped by rolling in the ordinary way; but as my process reduces the diameter or thickness of the articles to be polished, it is necessary to make a suitable allowance therefor by making the bars, plates, or sheets of sufficient size to admit of such reduction, so that after being polished they shall then have the dimensions required for the finished article.

The bars, plates, or sheets, before being subjected to the cold-rolling process, have the scale removed. For this purpose the best method is to place them in an acid-bath until the scale, caused by the original hot-rolling, is loosened, which is then removed, after which the surface of the iron or steel is freed from acid in any convenient manner. This leaves the surface of the iron or steel somewhat rough, or minutely honey-combed. The plates, bars, or sheets thus treated are then passed once, twice, or oftener between the polishing-rolls under heavy pressure, heavier than is ordinarily employed in rolling heated iron. The articles thus treated are passed through the rolls in a cold state, by which I mean devoid of artificial heat, because if subjected to reheating after coming from the acid-bath, a scale would be again formed on the surface, and the polishing would not be effected. The effect of this cold-rolling on the pieces of iron or steel previously scaled is to pack down the surface and communicate a perfectly smooth, hard, and polished exterior.

My polishing process has also the effect, described in a previous patent granted to me for cold-rolling iron and steel, of packing the fiber of the metal to such a degree as not only to give it a perfectly smooth and hard surface, but also to make the bars, though reduced in size, stiffer than they were before being subjected to the process. In order that the polished surface of the articles of iron or steel thus treated may be perfectly smooth, I use chilled rolls, with very carefully-prepared smooth surfaces, so that they shall not leave any marks on the polished steel or iron rolled between them; and in order to preserve this polish on the rolls, they should be exclusively used for the purpose of polishing, because if used for drawing out hot metal, they will receive marks or cracks, the impression of which will be communicated to the surface of the polished metal, and thus mar its beauty; and as in my process I roll the bars or plates when cold, the rolls need never become so heated as to produce cracks upon their surface.

It is needless to refer to the many uses to which bars, rods, plates, or sheets of iron or steel so finished or polished may be applied, as they will be obvious to all mechanics.

Having thus fully described my invention, what I claim as new, and desire to secure by Letters Patent, is—

1. The process of polishing and finishing bars, rods, plates, or sheets of iron or steel by first removing the scale and then cold-rolling them, substantially as hereinbefore described.

2. Also, as a new article of manufacture, bars, rods, plates, or sheets of iron or steel polished and finished by the process of scaling and cold-rolling, substantially as hereinbefore described.

In witness whereof I, the said BERNARD LAUTH, have hereunto set my hand.

BERNARD LAUTH.

Witnesses:

GEO. H. WISTAR,
WM. N. TAYLOR.